J. L. CREVELING.
ELECTRIC REGULATION.
APPLICATION FILED FEB. 16, 1912.

1,117,339.

Patented Nov. 17, 1914.

WITNESSES
F. Diehl.
Anna M. Wall.

INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,117,339.  Specification of Letters Patent.  Patented Nov. 17, 1914.

Application filed February 16, 1912. Serial No. 678,075.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to regulate a plurality of coöperating dynamos or generators in a predetermined manner and has for a particular object to provide means whereby the dynamos may be automaticaly regulated throughout wide changes in speed and used to charge a storage battery and operate lamps or other translating devices as will hereinafter appear.

Figure 1:
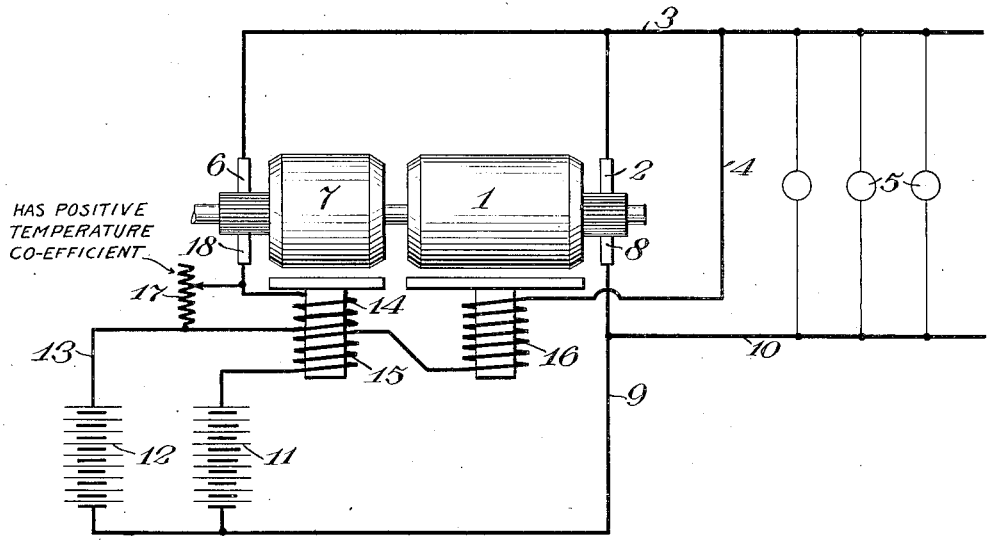
Figure 2:
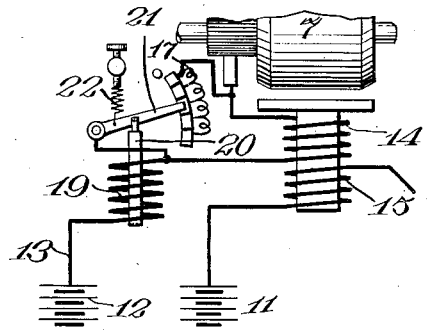
Figure 3:
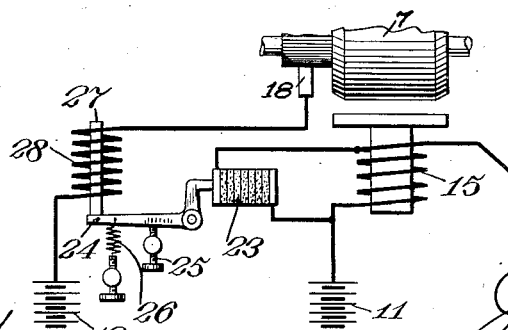

In the drawing, Figure 1 is a diagrammatic representation of one type of electric system comprehending my invention, and Figs. 2 and 3 show other forms of the system shown in Fig. 1.

In the drawing, referring particularly to Fig. 1, 1 represents the armature of a dynamo, the positive brush 2 of which is connected with the lead 3, which is in communication with the wire 4 and the positive side of the lamps or translating devices 5 and with the negative brush 6 of the armature 7. The negative brush 8 of the armature 1 is connected with the wire 9 in communication with the negative terminals of the translating devices 5 as by wire 10. The wire 9 is connected with the negative terminals of the storage batteries 11 and 12, the positive side of the battery 12 being connected as by wire 13 with a coarse differential field winding 14 upon the field magnet of the armature 7, the opposite end of the said winding being connected with the positive brush 18 of the armature 7, which is preferably driven by the same shaft as the armature 1. 17 is an adjustable shunt for adjusting the current in the coil 14. The positive terminal of the battery 11 is connected to one end of the coarse field exciting winding 15 of the armature 7, and the opposite end of said winding is in connection with one end of the coarse field winding 16 of the armature 1. The remaining terminal of the winding 16 is connected with the lead 3, as by wire 4.

In the form shown in Fig. 2, the resistance 17 of Fig. 1 is shown as controlled by a solenoid 19 in a series with the storage battery 12 and coil 14, said solenoid surrounding the core 20 attached to the lever 21 normally drawn in an upward direction as by adjustable spring 22 and so arranged that when the lever is pulled downwardly resistance 17 is increased and more current diverted through the coil 14.

In the form shown in Fig. 3, the differential coil 14 is omitted and a variable resistance shunt, indicated as a carbon pile 23, is placed in shunt around the coil 15. The resistance 23 is controlled by a lever 24 normally drawn downwardly as by the adjustable spring 26 against the stop 25. The lever 24 is provided at its end with a core 27 surrounded by the solenoid 28 in series with the battery 12, in such manner that current to the battery tends to lift the core and decrease the resistance of the shunt 23 around the coil 15.

An operation of my invention is substantially as follows, starting with the generators as running at some speed above the lowest speed at which they are designed to supply the system:

The fields of the dynamos having armatures 1 and 7 are set up by the windings 16 and 15 respectively, and these are energized by the storage battery 11, by current from the storage battery 11 flowing through the said field windings and wire 4 to the lead 3 and returning either through translating devices 5, wire 10 and wire 9 to the battery 11 or through wire 3, brush 6, armature 7, brush 18, differential winding 14, shunt 17, wire 13 and battery 12, or through both these paths. Therefore it will be obvious that the voltage of the armature 1 or the voltage across the translation circuit can never equal or exceed the voltage of the battery 11, regardless of the speed of the armature 1; for if the voltage across the armature 1 and the translation circuit were to equal the voltage of the battery 11, there would be no excitation of the field of the armature 1. However, by making the field windings 15 and 16 of as low resistance as possible and using a storage battery 11 with a very low internal resistance, I am able to cause wide variations in the strength of the field magnets 15 and 16 upon very small variations in electromotive force across the field windings. Therefore, the electro-motive force of the armature 1 will remain substantially constant at a value slightly below the voltage of the battery 11 throughout very great increases in speed of rotation, a slight increase in the voltage of said armature, causing a large diminution in the field current and consequent field strength. As the armature 7 is in series with the differential field winding 14, shunted by resistance 17, and the storage battery 12 and these three elements, thus arranged, are in shunt to the armature 1 and the translation circuit, and as the electromotive force of the armature 7 is added to that of the armature 1 and translation circuit, a higher voltage will be held across the storage battery 12 than across the generator 1 and the translation circuit, which, if of sufficient value, will cause the battery 12 to be charged and I so proportion the coil 15, that the electromotive force of the armature 7, which will remain constant throughout very wide speed changes for the same reason as the armature 1, shall be that amount desired to have impressed upon the battery 12 above that of the armature 1 and the translation circuit and, I so proportion the differential coil 14 and the shunt 17, that if this voltage tend to deliver too great a current to the storage battery 12, that portion of the current flowing through the differential winding 14 will cut down the electro-motive force of the armature 7 and thus diminish the charging current to the battery 12.

In practice, it is advisable to make the coil 14 of only a few turns and to make the shunt 17 of iron wire, then when the battery is receiving substantially its normal current or less, the effect of the coil 14 is very little. However, an abnormal current to the battery 12 will cause the shunt 17 to increase in resistance, owing to its temperature coefficient and the proportion of current diverted through the coil 14 will be raised as well as the total current delivered to the battery and, under these conditions, the electromotive force of the armature 7 will be modified when desired by the coil 14 and very slightly affected under normal conditions. This feature of affecting the voltage of the armature 7 only when too great a current is being delivered to the battery, may be more perfectly carried out by the structures shown in Figs. 2 and 3, for in that form shown in Fig. 2, the coil 14 may, if desired, be shunted out entirely until too great a current is flowing to the battery and then the current in solenoid 19 may cause the core 20 to be drawn downwardly against the action of spring 22 and increase resistance 17 in such manner as to divert a portion of the current through the differential winding.

In that form shown in Fig. 3, no differential winding is employed and, when the current to the storage battery 12 passing through, the solenoid 28 tends to increase above a predetermined limit, the same may cause the lever 24 to be drawn upwardly against the tension of spring 26 so as to decrease the resistance 23 and shunt a portion of the field exciting current away from the field exciting coil 15 in such manner as to prevent the desired charging current from being appreciably exceeded.

Therefore, as the speed of the generators varies above the minimum desired working speed, the voltage upon the translation circuit remains substantially constant throughout wide changes in speed and load, and the voltage across the battery 12 remains substantially constant at a value equal to that across the armature 1 and the translation circuit plus the voltage of the armature 7 which will also remain substantially constant throughout speed changes while this voltage may be modified in accordance with the current delivered to the battery 12 by virtue of said electro-motive force, and, therefore, the lamps or translating devices will be supplied at substantially a constant voltage and the battery 12 will be charged upon a constant voltage subject to modification by an excess charging current throughout great changes in speed of rotation of the armatures of the generators.

It will be noted that I have purposely omitted any switches in the various circuits and any operation of my invention except that, when the generators are working at or above the desired minimum working speed, which is sufficient to explain my invention with the system in operation under normal running conditions, means for handling the various instrumentalities and circuits under other conditions, as for example, with the generators at rest and stopping and starting, are purposely omitted as they form no part of the present invention and are the subject matter of separate applications.

I do not wish in any way to limit myself to the exact details of construction and arrangement nor to the exact details of operation given above to illustrate one form of my invention, for it will be obvious that wide departure in the way of details may be made without departing from the spirit and scope of my invention, which is as set forth in the following claims:

1. The combination with a plurality of generators, a translation circuit supplied by one of said generators, a circuit containing a storage battery supplied by both of said generators, and means for setting up magnetic fields for both of said generators, of an independent source of electro-motive force supplying current thereto controlled by the electro-motive force of one of said generators, and automatic means for controlling the electro-motive force of one of said generators.

2. The combination with a plurality of generators, a translation circuit supplied by one of said generators, a circuit containing a storage battery supplied by both of said generators, and means for setting up magnetic fields for both of said generators of an independent source of electro-motive force supplying current thereto opposed to the electro-motive force of one of said generators and automatic means for controlling the electro-motive force of one of said generators.

3. The combination with a plurality of generators having armatures subject to corresponding variations in speed, a translation circuit in operative communication with one of said armatures, a storage battery in series with both of said armatures, field magnets for both of said armatures comprehending windings, a source of electro-motive force for energizing said windings and affecting the same in accordance with the voltage across one of said armatures and automatic means for further regulating the effect of one of said windings.

4. The combination with a plurality of generators having armatures subject to corresponding variations in speed, a translation circuit in operative communication with one of said armatures, a storage battery in series with both of said armatures, field magnets for both of said armatures comprehending windings, a source of electro-motive force for energizing said windings and affecting the same in opposition to the electro-motive force across one of said armatures and automatic means for affecting the electro-motive force of one of said armatures in response to current fluctuations.

5. The combination with a plurality of generators comprehending a plurality of armatures subject to corresponding variations in speed and field magnets for said armatures, of circuits supplied by said armatures and a source of electromotive force for energizing said magnets in accordance with the voltage across one of said armatures and automatic means for varying the relative effect of said field magnets in response to current fluctuations.

6. The combination with a plurality of generators comprehending a plurality of armatures subject to corresponding variations in speed and field magnets for said armatures, of circuits supplied by said armatures and a source of electromotive force for energizing said magnets in accordance with the voltage across one of said armatures and automatic means for varying the energization of one of said field magnets in response to fluctuations in a circuit supplied by one of said armatures.

7. The combination with a plurality of generators comprehending a plurality of armatures subject to corresponding variations in speed and field magnets for said armatures, of circuits supplied by said armatures, and a source of electromotive force for energizing said field magnets in accordance with the voltage across one of said armatures and opposed to the electro-motive force of one of said armatures and automatic means for controlling the relative effects of said field magnets.

8. The combination with a plurality of generators comprehending a plurality of armatures subject to corresponding variations in speed and field magnets for said armatures, of circuits supplied by said armatures and a source of electromotive force for energizing said field magnets in accordance with the voltage across one of said armatures opposed to the electro-motive force of one of said armatures and current responsive means for adjusting the relative values of said field magnets.

9. The combination with a plurality of generators provided with armatures and field windings, a translation circuit in shunt to one of said armatures, a storage battery having in series therewith one of said armatures in a circuit in shunt to the first named armature, a source of electro-motive force in series with said field windings in a circuit in shunt to the first named armature and automatic means for controlling the effect of one of said field windings.

10. The combination with a generator having an armature and a field winding, of a translation circuit in operative relation thereto, a generator having an armature, a storage battery in series therewith, a circuit containing said last named armature and a storage battery in operative relation to the first named armature, a field magnet winding for said last named armature in a circuit supplying both of said windings and in shunt to the first named armature and automatic means for regulating the second named generator.

11. The combination with a generator having an armature and a field winding, of a translation circuit in operative relation thereto, a generator having an armature, a storage battery in series therewith, a circuit containing said last named armature and storage battery in operative relation to the first named armature, a field magnet winding for said last named armature in a circuit supplying both of said windings and in shunt to the first named armature and automatic means for regulating the second named generator in response to the operation thereof.

12. The combination with a translation circuit, of a generator having an armature across said circuit and a field winding, a dynamo having an armature and a field magnet, a storage battery in series with said last named armature across said translation circuit, a source of electro-motive force for energizing both of said field magnets in circuit across said translation circuit and automatic means for controlling the effective strength of one of said field magnets.

JOHN L. CREVELING.

Witnesses:
ALFONSE F. SPIEGEL,
ANNA M. WALL.